United States Patent

[11] 3,589,271

| [72] | Inventors | James H. Tarrant<br>Huntington Park;<br>Arthur L. Stoner, Rolling Hills Estates, both of, Calif. |
|---|---|---|
| [21] | Appl. No. | 844,759 |
| [22] | Filed | July 25, 1969 |
| [45] | Patented | June 29, 1971 |
| [73] | Assignee | Western Urn Manufacturing Company<br>Los Angeles, Calif. |

[54] COFFEE MAKING APPARATUS
14 Claims, 12 Drawing Figs.

[52] U.S. Cl. .................................................. 99/280, 99/305
[51] Int. Cl. .................................................. A47j 31/56
[50] Field of Search ......................................... 99/280, 281, 282, 305

[56] References Cited
UNITED STATES PATENTS
2,568,474  9/1951  Sciver.......................... 99/281 X

*Primary Examiner*—William T. Price
*Attorney*—Nilsson, Robbins, Wills and Berliner ABSTRACT: A coffee making apparatus in which a single piece container, molded of plastic material having insulation properties, forms a control chamber and a water heating chamber sharing a common wall, the water heating chamber receiving near its bottom wall a heating coil having extensions projecting to the op of the wall or partition and folded thereover for connection to an electrical source. A thermostat element is conductively connected to the heating coil and provided with a connecting member also folded over the wall. The water heating chamber receives at its upper portion a reservoir member having a depending supply tube terminating adjacent the heating coil to deliver cold water, and a siphon is provided having an upper end located above the bottom of the reservoir and a lower end terminating in a spray head located under the bottom wall of the water heating chamber. The reservoir member is intended to be filled with cold water, which may be supplied manually or may be supplied through a valve from a water supply, the valve being controlled by water level sensors.

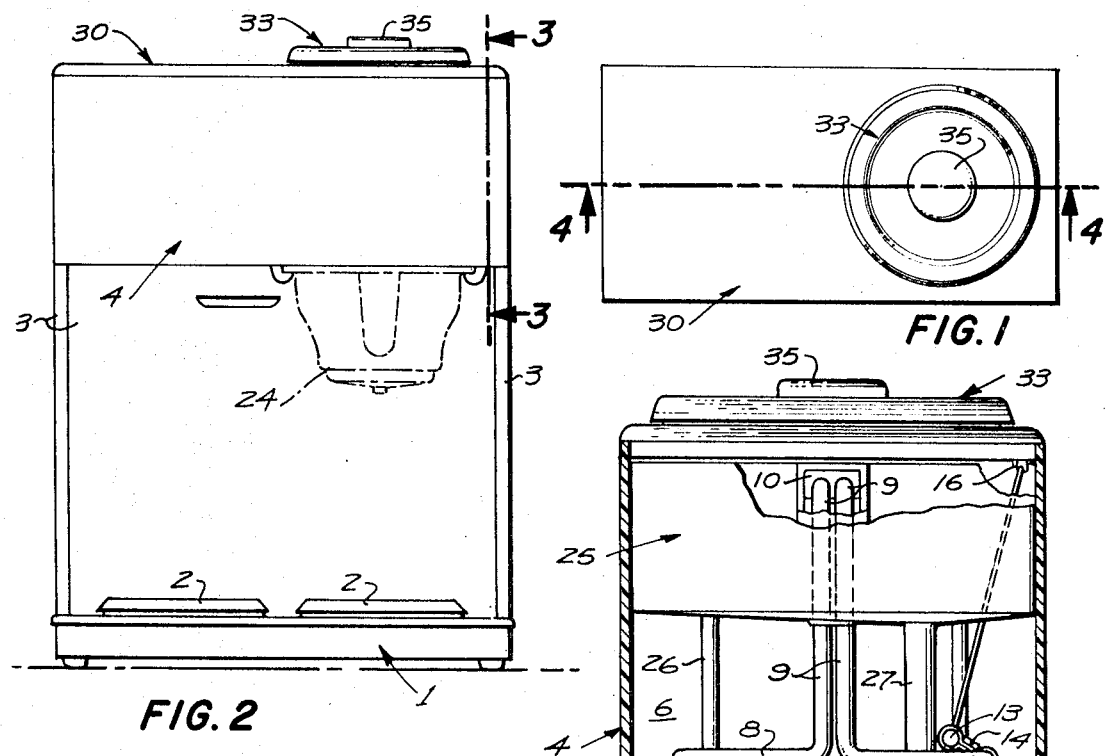
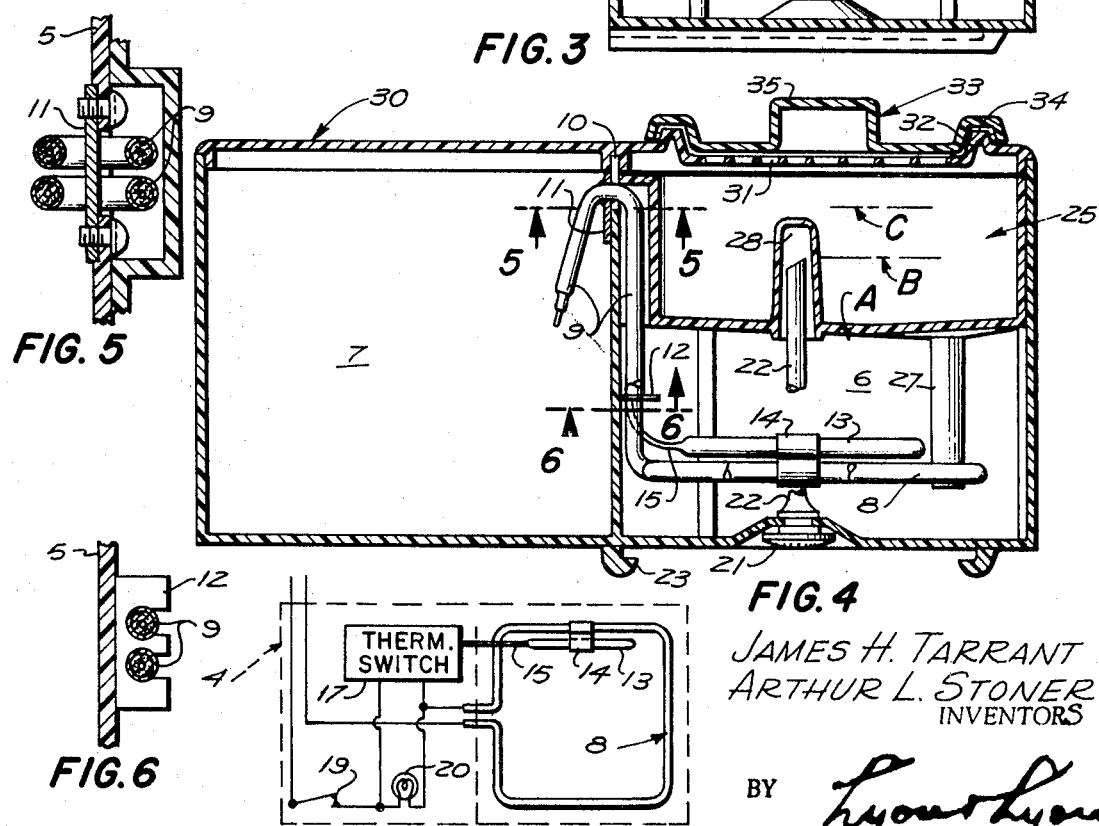

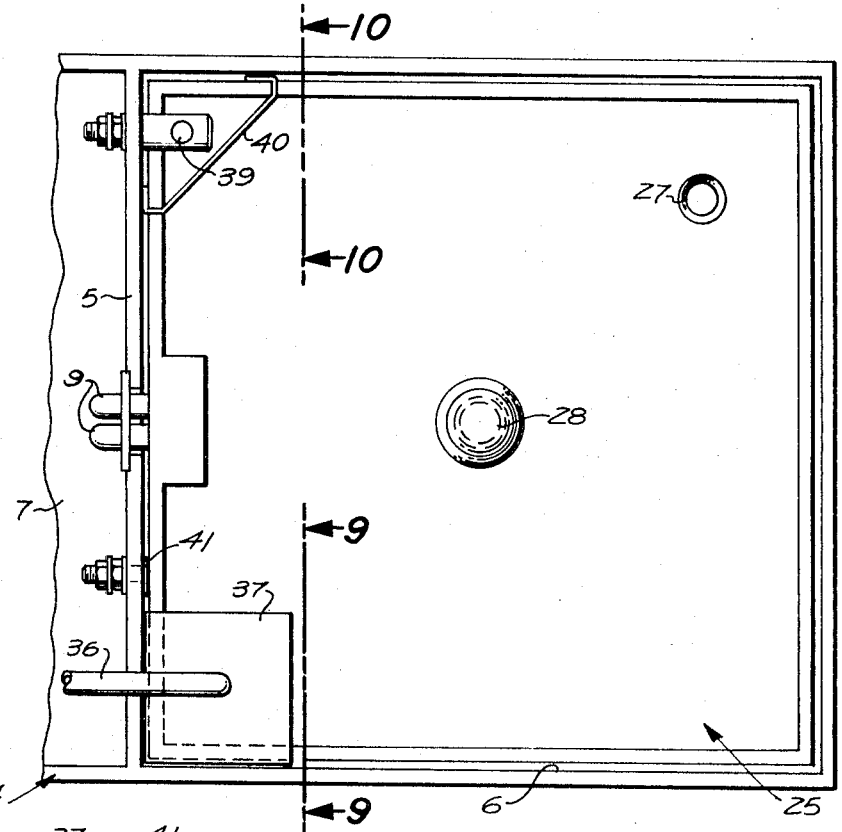
FIG. 8
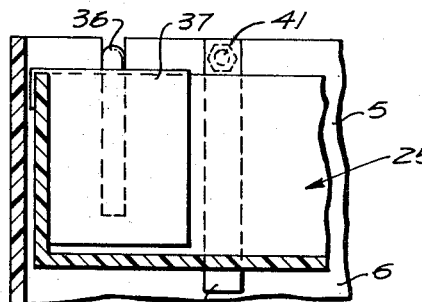
FIG. 9
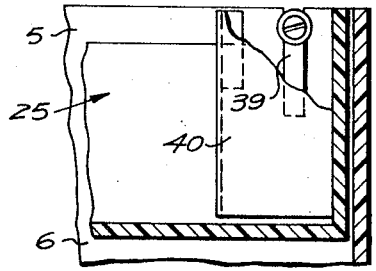
FIG. 10
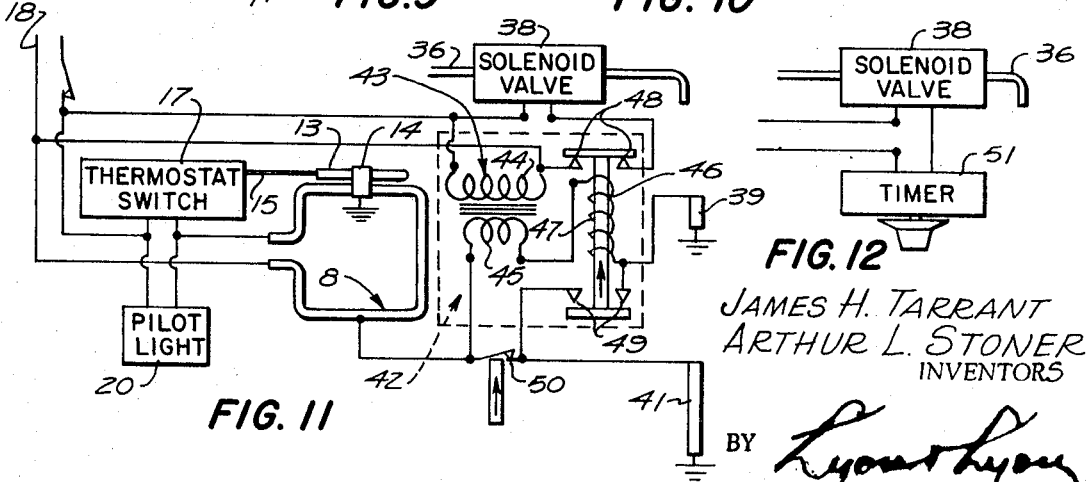
FIG. 11
FIG. 12
JAMES H. TARRANT
ARTHUR L. STONER
INVENTORS
BY Lyon+Lyon
ATTORNEYS

COFFEE MAKING APPARATUS

BACKGROUND OF THE INVENTION

Coffee making apparatus intended primarily for commercial use include two types. The first type involves the manual pouring of a selected charge of cold water into the brewing apparatus to cause the discharge of a like amount of hot brewed coffee, as exemplified in U.S. Pat. No. 3,220,334. The second type is permanently connected to a source of cold water through a valve which is controlled so as to deliver a predetermined charge of cold water to the brewing apparatus, as exemplified in U.S. Pat. No. 3,371,593. The present invention includes a first embodiment which is directed to an improvement of the first type of coffee making apparatus while retaining the advantage inherent in utilizing the manual introduction of cold water as a means of determining the quantity of brewed coffee; and a second embodiment which utilizes the construction of the first embodiment and adds thereto a mechanism to convert the brewing apparatus to the second type, or automatic coffee brewing apparatus.

SUMMARY OF THE INVENTION

The present invention is summarized in the following objects:

First, to provide a coffee making apparatus wherein a single piece container molded of plastic material having insulating properties forms a control chamber and a water heating chamber sharing a common wall, the bottom of the brewing chamber having a spray outlet and guide tracks to support a brewing basket.

Second, to provide a coffee making apparatus wherein a heating coil provided in the water heating chamber and the sensing element of its thermostat are provided with connections which extend to the top of the common wall and are folded thereover for appropriate electrical connection within the control chamber thus avoiding perforation of the wall and the danger of leakage.

Third, to provide a coffee making apparatus wherein the thermostat sensing element is joined by a thermally conductive member to the heating element so that should the water heating chamber be dry, the thermostat will cycle "off" and "on" until noticed thereby protecting the heating coil from overheating.

Fourth, to provide a coffee making apparatus as indicated in the preceding objects which may be converted to an automatic coffee brewing apparatus by addition of a supply line and either water level sensors or timing control, which may be accommodated in the control chamber.

DESCRIPTION OF THE DRAWINGS

FIG. 1 is a plan view of the coffee making apparatus.

Fig. 2 is a front view thereof.

FIG. 3 is an enlarged sectional view thereof, taken through 3-3 of FIG. 2, with portions shown in elevation.

FIG. 4 is an enlarged sectional view, taken through 4-4 of FIG. 1, with portions shown in elevation.

FIG. 5 is a further enlarged fragmentary sectional view, taken through 5-5 of FIG. 4.

FIG. 6 is another further enlarged sectional view, taken through 6-6 of FIG. 4.

FIG. 7 is a diagrammatical view, showing principally the electrical parts of the coffee making apparatus.

FIG. 8 is a fragmentary plan view of the coffee making apparatus as modified to incorporate automatic control means.

FIG. 9 is a fragmentary sectional view, taken through 9-9 of FIG. 8.

FIG. 10 is a fragmentary sectional view, taken through 10-10 of FIG. 8.

FIG. 11 is a wiring diagram showing the automatic control means.

FIG. 12 is a fragmentary wiring diagram illustrating a modification of the automatic control means. Reference is first directed to FIGS. 1 through 7. The coffee making apparatus herein illustrated is mounted on a flat base structure 1, which may be provided with a pair of conventional warming units 2. Three sides of the base structure, which is rectangular in plan, are provided with marginal walls 3, leaving one side open. Supported at the upper extremities of the marginal walls 3 is a container structure 4.

The container structure is preferably an injection molded single piece, having bottom and sidewalls as well as a dividing wall 5, so as to separate the container structure into a water heating chamber 6 and a control chamber 7.

The water heating chamber receives a heating element 8, which is shown as a square loop, and is provided with extensions 9 disposed at right angles to the heating element. The extensions 9 project upwardly adjacent the dividing wall 5 and are folded intermediate their ends to be received in a clearance notch 10 provided at the upper margin of the dividing wall so that their extremities may extend into the control chamber 7. In the folded region of the extensions 9, a retainer plate 11 is secured thereto and is in turn secured to the dividing wall 5. The retaining plate secures the heating element 8 and the extensions 9 in position within the water heating chamber 6. In addition, a suitable spacer plate 12, located at the lower extremities of the extensions 9, is fitted therebetween and bears against the dividing wall 5, as shown in FIG. 6.

A sensing element 13 is supported alongside but spaced from the heating element 8 by means of a combined clamp and heat transferring means 14 in the form of a strip of metal folded around the heating element and the sensing element and secured by a suitable screw. The clamp and heat transferring means 14 is of sufficient size that should the heating element be energized when there is no water in the chamber 6, sufficient heat is transmitted to the sensing element 13 to cause the heating element to be shutoff before it reaches and excessive temperature. The sensing element 13 is preferably the conventional fluid filled type and is joined to a capillary tube 15 which extends upwardly to the top margin of the dividing wall 5 and through a clearance notch 16 into the control chamber 7.

The capillary tube 15 extends into a conventional thermostat switch 17 electrically interposed between the heating element 8 and a supply line 18. A main switch 19, which remains on so as to maintain a supply of heated water, is arranged in series with the thermostat switch and the supply line, and a pilot light 20 is electrically connected in the circuit so as to be "on" when the heating element 8 is "off" to indicate that the water is at brewing temperature.

The bottom of the water heating chamber 6 is provided with a small recess in which is set a spray head 21. Attached to the spray head and extending upwardly in the water heating chamber 6 is a siphon tube 22.

The underside of the water heating chamber 6 is provided with a pair of parallel guide members 23, arranged to receive the flange of a conventional brewing vessel 24 arranged to contain coffee over which water is poured.

The upper portion of the water heating chamber 6 receives a reservoir tray 25 which rests on supporting ribs 26 provided on the sidewalls of the chamber 6. The bottom of the reservoir tray forms a horizontal partition or wall and the tray includes sidewalls which overlie the upper portions of the sidewalls of the water heating chamber. The reservoir tray is provided with a water discharge tube 27 which extends to a point near the bottom wall of the chamber 6. The horizontal wall of the reservoir tray is also provided with a siphon cap 28, in the form of a downwardly facing socket; that is, the lower end of the siphon cap projects a slight distance below the bottom wall of the reservoir tray and is open, whereas the upper end of the siphon cap is closed and is located within the reservoir tray above the horizontal wall. The siphon cap receives the upper portion of the siphon tube 22.

One sidewall of the reservoir tray forms externally with the confronting portion of the dividing walls 5 an upwardly directed clearance passage 29, closed at its upper end. The clearance passage receives the upper portions of the extensions 9.

The container structure 4 receives a rectangular cover 30 which is removably secured thereto by screws or other fastening means and, if desired, is provided with suitable gaskets, not shown. In the region above the water heating chamber and the reservoir tray, the cover is provided with an inlet grid 31, having a raised rim 32, so that a measured quantity of water may be poured through the grid 31 and into the reservoir tray 25. The inlet grid 31 receives a removable lid 33, having a raised rim 34 and a central handle 35. Suitable spacing means is provided between the rim 32 and the rim 34 so that air may enter or escape from the water heating chamber 6 and the reservoir tray 25.

Operation of the coffee making apparatus, shown in FIGS. 1 through 7, is as follows:

Prior to operating the coffee making apparatus, water is poured into the water heating chamber 6, through the inlet grid 31, or the reservoir tray 25 may be removed for this purpose. The initial quantity of water is such as to bring its surface in substantial coincidence with the open lower end of the siphon cap 28. This initial supply of water is heated to nearly the boiling point. At any time after the water has reached brewing temperature, a measured additional quantity of water may be poured manually through the inlet grid 31. A minimal quantity of water is such as merely to exceed the height of the siphon tube 22. If a larger brew is desired, the measured quantity of water may be greater, assuming, of course, that the volume of water does not exceed the capacity of the reservoir tray. When the level of the water exceeds the height of the siphon tube 22, water is siphoned from the lower portion of the water heating chamber, permitting a like quantity of water to enter through the discharge tube 27. When the water has been withdrawn to bring the level to the plane A, indicated in FIG. 4, further withdrawal of water is stopped. On discharging, the water is distributed by the spray head 21 in a conventional manner onto a charge of coffee contained within a filter cup. The brewed coffee discharges from the brewing vessel into a decanter, not shown.

The container is formed of a plastic material capable of withstanding water at nearly its boiling temperature and having thermal insulating properties. Examples of such material are Polysulfone and Polyphenylene Oxide.

Reference is now directed to the construction shown in FIGS. 8 through 11. The construction here illustrated is the same as the preceding construction except that there has been added, principally in the control chamber 7, means which convert the coffee making apparatus to automatic control. More specifically, a water supply line 36 extends through the control chamber 7 and over the dividing wall 5 and into the reservoir tray 25. The discharge end of the line 36 is shielded by a baffle 37 to avoid splashing. Within the control chamber 7 the supply line 36 is provided with a solenoid valve 38.

Located within the tray 25 is an upper water sensor or probe 39, protected by a baffle 40. Extending downwardly between the wall of the water heating chamber and the adjacent wall of the reservoir tray 25, and terminating a short distance below the bottom of the tray, is a lower water sensor or probe 41.

Located within the control chamber 7 is a relay 42 which includes a voltage reducing transformer 43, comprising a primary coil 44 and a secondary coil 45. The secondary coil 45 is connected to a relay armature coil 46, which receives a relay armature 47. The armature is movable to connect a pair of valve control contacts 48 and upper probe contacts 49. Mounted on the front of the control chamber 7 is a push button switch 50, which normally occupies a closed position.

The secondary coil 45 is connected in series with the relay armature coil 46 which inturn is connected to the upper probe 39, which, when the probe is partially immersed in water, completes a ground circuit to the sheath containing the heating element 8 to which the remaining side of the secondary coil 45 is connected. A parallel circuit also exists between the upper probe contacts 49 and the switch 50. Also, the switch 50 is connected to the lower probe 41.

Operation of the construction shown in FIGS. 8 through 11 is as follows:

When the coffee making apparatus is initially operated, the circuit through the solenoid valve is completed through the normally closed contacts 48, so that water fills the chamber 6 until the water contacts the upper sensor or probe 39, completing a circuit through the armature coil 46, thereby closing the solenoid valve 38. Effective height of the liquid level in the tray, when the solenoid valve shuts off, is slightly above the operating level of the siphon formed by the cap 28 and discharge tube 27. As a consequence, a charge of water flows from the tray 25 until the siphon action is broken. The water at this level is slightly below the lower probe 41, which is the normal level of water in the heating chamber 6. Under this condition, the heating element 8 is in operation, and the water is heated to a temperature determined by the thermostat switch 17. When the pilot light indicates that the water is heated, the switch 50 may be momentarily opened which breaks the circuit through the armature coil 46, permitting the contacts 48 to close, thereby opening the solenoid valve for the supply of water to the tray. The supply of water continues until a ground circuit is completed between the upper probe 39 and the heating coil housing, energizing the coil 46 and closing the contacts 49.

While the charge of brewing water is being supplied to the brewing vessel, the lower probe 41 provides a redundant ground circuit across the armature coil 46 so that should the switch 50 be opened, the circuit through the armature coil 46 is not broken; thus preventing accidental operation of the solenoid valve.

Reference is directed to FIG. 12. This case, the solenoid valve 38 is controlled by a timer 51, arranged to operate between a minimum time calculated to bring the water to the level B, shown in FIG. 4, and a maximum time calculated to bring the water to the level C, shown in FIG. 4. The timer thus predetermines the quantity of coffee brewed. In this respect, it will be noted that the arrangement shown particularly in FIG. 11 is calculated to supply a uniform quantity of coffee brew with each operation.

While particular embodiments of this invention have been shown and described, it is not intended to limit the same to the details of the constructions set forth, but instead, the invention embraces such changes, modifications and equivalents of the various parts and their relationships as come within the purview of the appended claims.

We claim:

1. A coffee making apparatus, comprising:

a. a single piece container structure including a bottom wall, sidewalls and a partition separating said container into a control chamber and a water heating chamber;

b. a heating element adjacent the bottom wall of said water heating chamber, said heating element having extensions disposed adjacent said partition, reaching to the top thereof and terminating within said control chamber;

c. means in said control chamber for controlling said heating element;

d. a single piece reservoir tray received in the upper portion of said water heating chamber, said tray including a bottom wall having an integral depending discharge tube terminating adjacent the bottom wall of said water heating chamber, and a downwardly open integral siphon cap projecting above said bottom wall;

e. a spray head disposed in the bottom wall of said water heating chamber; and a siphon tube extending from said spray head into said siphon cap;

f. said water heating chamber adapted to be filled with water approximately to the level of the bottom wall of said tray, and said tray adapted to receive a supplementary charge of water sufficient to cause operation of said siphon tube thereby to cause discharge of water from said spray head corresponding to said supplemental charge.

2. A coffee making apparatus, as defined in claim 1, wherein:
   a. a temperature sensing element is disposed adjacent said heating element;
   b. and a heat conducting member extends between said elements to transmit heat directly to said temperature sensing element in the event the heating element is not covered by water, said heat conducting member having, when covered by water, sufficient area to be maintained at water temperature whereby said temperature sensing element indicates water temperature.

3. A coffee making apparatus, as defined in claim 1, wherein:
   a. said container structure is open at its upper side exposing said control chamber and water heating chamber;
   b. a single piece cover is fitted on said container structure and includes a recessed perforated area overlying said tray for the pouring of water therethrough into said tray.

4. A coffee making apparatus, as defined in claim 1, wherein:
   a. a mounting member is secured to said extensions wherein said control chamber, and is secured to the upper portion of said partition.

5. A coffee making apparatus, as defined in claim 1, which further comprises:
   a. a water supply line terminating in said tray;
   b. a solenoid valve interposed in said line;
   c. and means for operating said solenoid valve to supply said supplementary charge of water.

6. A coffee making apparatus, as defined in claim 5, wherein said operating means includes:
   a. a momentarily actuated switch for initiating supply of water to said tray;
   b. a first water level sensor in said tray for terminating flow of water;
   c. and a second water level sensor in said heating chamber operable to nullify operation of said switch should it be engaged during discharge of water from said tray.

7. A coffee making apparatus, as defined in claim 5, wherein said operating means includes:
   a. an adjustable timer permitting operation of said valve for a preselected length of time calculated to fill said tray to a corresponding preselected level.

8. An apparatus for supplying hot water to a coffee brewing vessel, comprising:
   a. a closed container structure including a bottom wall and a horizontal wall thereabove, said horizontal wall dividing the container into a lower chamber and an upper chamber;
   b. a depending discharge tube extending from said horizontal wall into proximity to said bottom wall;
   c. a siphon cap projecting upwardly from said horizontal wall, said cap being closed at its upper end and open at its lower end;
   d. a spray head set into said bottom wall;
   e. a siphon tube extending upwardly from said spray head into said siphon cap and terminating at a level above said horizontal wall;
   f. a heating element in said lower chamber;
   g. means for supporting a coffee brewing vessel under said spray head;
   h. said lower chamber being normally filled with water to the level of the lower open end of said siphon cap, the water being maintained in a heated condition by said heating element and means.

9. An apparatus, as defined in claim 8, wherein:
   a. said means for introducing water includes a cover for said container having an opening for manual introduction of water.

10. An apparatus, as defined in claim 8, wherein said means for introducing water includes:
    a. a water line terminating in said tray;
    b. a solenoid valve interposed in said line;
    c. and means for operating said valve to supply said measured quantity.

11. A coffee brewing apparatus, as defined in claim 10, wherein said operating means includes:
    a. a momentarily actuated switch for initiating introduction of water to said upper chamber;
    b. a first water level sensor in said tray for terminating flow of water;
    c. and a second water level sensor in said lower compartment operable to nullify operation of said switch during discharge of water into said coffee brewing vessel.

12. A coffee brewing apparatus, as defined in Claim 10, wherein said operating means includes:
    a. an adjustable timer permitting operation of said valve for a preselected interval.

13. An apparatus, as defined in claim 8, wherein:
    a. said container includes a passageway extending above said horizontal wall to a level above the maximum water level in said upper chamber and isolated therefrom;
    b. said heater includes extensions passing into said passage and exiting from said container above said maximum water level.

14. An apparatus, as defined in claim 8, wherein:
    a. a temperature sensing element is disposed in said lower chamber;
    b. a heat conducting member joins said heating element and sensing element to transmit heat from said heating element to said sensing element in the event said lower chamber is without water, thereby to prevent overheating of said heating element, said member having sufficient area to cause said member to be maintained at approximately water temperature when immersed in water.